(12) United States Patent
Schmidt et al.

(10) Patent No.: US 8,406,188 B2
(45) Date of Patent: Mar. 26, 2013

(54) SYSTEM AND METHOD FOR MANAGING A WIRELESS RADIO NETWORK

(75) Inventors: Jeffrey C. Schmidt, Orlando, FL (US); Philip Hill, Oviedo, FL (US); Hrishikesh Gossain, Heathrow, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 291 days.

(21) Appl. No.: 12/777,796

(22) Filed: May 11, 2010

(65) Prior Publication Data

US 2011/0280194 A1 Nov. 17, 2011

(51) Int. Cl.
  *H04W 4/00* (2009.01)
(52) U.S. Cl. ........................................ 370/329
(58) Field of Classification Search .................. 370/203, 370/204–271, 310–350, 351–394, 395.1, 370/395.3, 395.4, 395.41, 395.42, 395.5, 370/395.52, 395.53, 412–421, 431–497, 370/498–522, 523–520, 521–529
See application file for complete search history.

(56) References Cited

U.S. PATENT DOCUMENTS

| | | | |
|---|---|---|---|
| 5,608,727 | A | 3/1997 | Perreault et al. |
| 5,729,531 | A | 3/1998 | Raith et al. |
| 7,088,997 | B1 | 8/2006 | Boehmke |
| 7,349,880 | B1 | 3/2008 | Kitao |
| 7,460,837 | B2 | 12/2008 | Diener |
| 2004/0087310 | A1 | 5/2004 | Williamson et al. |
| 2005/0289618 | A1* | 12/2005 | Hardin ............................ 725/95 |
| 2006/0031082 | A1 | 2/2006 | Amaitis et al. |
| 2006/0083205 | A1 | 4/2006 | Buddhikot et al. |
| 2006/0143111 | A1 | 6/2006 | Mylet |
| 2006/0218392 | A1 | 9/2006 | Johnston |
| 2006/0262768 | A1 | 11/2006 | Putzolu |
| 2007/0106596 | A1 | 5/2007 | Bayyapu et al. |
| 2007/0274404 | A1 | 11/2007 | Papandriopoulos et al. |
| 2008/0052387 | A1 | 2/2008 | Heinz et al. |
| 2008/0108365 | A1 | 5/2008 | Buddhikot et al. |
| 2008/0183634 | A1 | 7/2008 | Sadler |
| 2008/0221951 | A1 | 9/2008 | Stanforth et al. |
| 2008/0222019 | A1 | 9/2008 | Stanforth et al. |
| 2008/0222021 | A1 | 9/2008 | Stanforth et al. |
| 2008/0233946 | A1* | 9/2008 | Henry ........................ 455/422.1 |
| 2009/0017761 | A1 | 1/2009 | Li et al. |
| 2009/0046625 | A1 | 2/2009 | Diener et al. |
| 2009/0161617 | A1* | 6/2009 | Abedi ........................... 370/329 |
| 2009/0197627 | A1 | 8/2009 | Kuffner et al. |
| 2009/0298522 | A1* | 12/2009 | Chaudhri et al. ............. 455/509 |
| 2010/0246506 | A1* | 9/2010 | Krishnaswamy ............. 370/329 |

(Continued)

OTHER PUBLICATIONS

Kwerel, Evan et al., "A Proposal for a Rapid Transition to Market Allocation of Spectrum", Federal Communications Commission, 2002, OPP Working Paper No. 38, pp. 1-50.

(Continued)

*Primary Examiner* — Jung-Jen Liu
(74) *Attorney, Agent, or Firm* — Renner, Otto, Boisselle & Sklar, LLP

(57) ABSTRACT

A communication system includes wireless access points that are distributed along a linear, terrestrial-based communications medium that has an operative interface to the Internet. The wireless access points establish wireless connectivity between end users in residences and businesses to the Internet via the communications medium. The operating channel for each wireless access point is controlled by a spectrum management system to control use of available spectrum in an efficient manner and to minimize interference.

20 Claims, 2 Drawing Sheets

U.S. PATENT DOCUMENTS

2011/0250916 A1* 10/2011 Li et al. .......................... 455/509
2012/0163179 A1* 6/2012 Jo et al. .......................... 370/237

OTHER PUBLICATIONS

By the Commission, "Second Report and Order, Order on Reconsideration, and Second Further Notice of Proposed Rulemaking", Federal Communications Commission, 2004, FCC 04-167, pp. 1-180.
Mcknight, Lee et al., "Best Effort versus Spectrum Markets: Wideband and Wi-Fi versus 3G MVNOs?", pp. 1-18.
Prabhu, Krish et al., "Time for Action" Genuine Ideas, 2002, [retrieved online Feb. 1, 2008], <http://www.genuineideas.com/ArticlesIndex/TimeForAction.htm>.
FCC 08-260, Second Report and Order and Memorandum Opinion and Order, Adopted Nov. 4, 2008 and Released Nov. 14, 2008.
"Digital Dividend: Cognitive Access, Consultation on License-Exempting Cognitive Devices using Interleaved Spectrum", OFCOM, Publication Date: Feb. 16, 2009.
U.S. Spectrum Management Policy: Agenda for the Future, 1991.
Radio Spectrum Management, Module 5 of ICT Regulation Toolkit, ITU, 2007.
Jones, Steven K. et al., "Initial Evaluation of the Performance of Prototype TV-Band White Space Devices", (2007), OET Report, FCC/OET 07-TR-1006.
47 C.F.R. 15.713.

* cited by examiner

SYSTEM AND METHOD FOR MANAGING A WIRELESS RADIO NETWORK

TECHNICAL FIELD OF THE INVENTION

The technology of the present disclosure relates generally to wireless communications infrastructure and, more particularly, to a system and method for managing a wireless radio network having a terrestrial distribution medium.

BACKGROUND

Wireless networks and systems are becoming increasingly popular. But wireless communications are constrained due to a lack of available, interference free spectrum that may be used for reliable communications within a geographic area. Also, "last mile" connectivity has presented challenges. Last mile connectivity refers to the establishment of operative communications between users in homes and businesses to a network, such as the Internet. For instance, installing terrestrial-based communications lines (e.g., using fiber optics or coaxial cable) to support high-speed Internet access to end users in rural areas may be cost prohibitive due to the terrain and distances involved.

SUMMARY

The present disclosure describes a communication system where wireless access points are distributed along a linear, terrestrial-based communications medium, such as a fiber optic communication medium or a coaxial cable communication medium. The communication medium has an operative interface to the Internet. The wireless access points establish wireless connectivity between end users in residences and businesses to the Internet via the communications medium. The operating channel for each wireless access point is controlled by a spectrum management system to control use of available spectrum in an efficient manner and to minimize interference.

According to one aspect of the disclosure, a distributed wireless network for delivering Internet connectivity to geographically diverse wireless subscriber devices includes a plurality of wireless access points that operatively connect to the Internet through a terrestrial distribution medium, each wireless access point configured to establish a wireless interface with at least one of the wireless subscriber devices for providing Internet connectivity to the wireless subscriber device, and each wireless access point controlled by a channel allocation engine to operate on a channel selected by the channel allocation engine from an available channel pool associated with the wireless access point using channel selection parameters to minimize interference between the wireless access points and the wireless subscriber devices.

According to another aspect of the disclosure, a spectrum management system for a distributed wireless network that delivers Internet connectivity to geographically diverse wireless subscriber devices and that includes a plurality of wireless access points that operatively connect to the Internet through a terrestrial distribution medium includes a channel allocation engine configured to allocate operating channels to each of the wireless access points, the allocation including selecting each respective operating channel from an available channel pool associated with the wireless access point using channel selection parameters to minimize interference between the wireless access points and the wireless subscriber devices.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
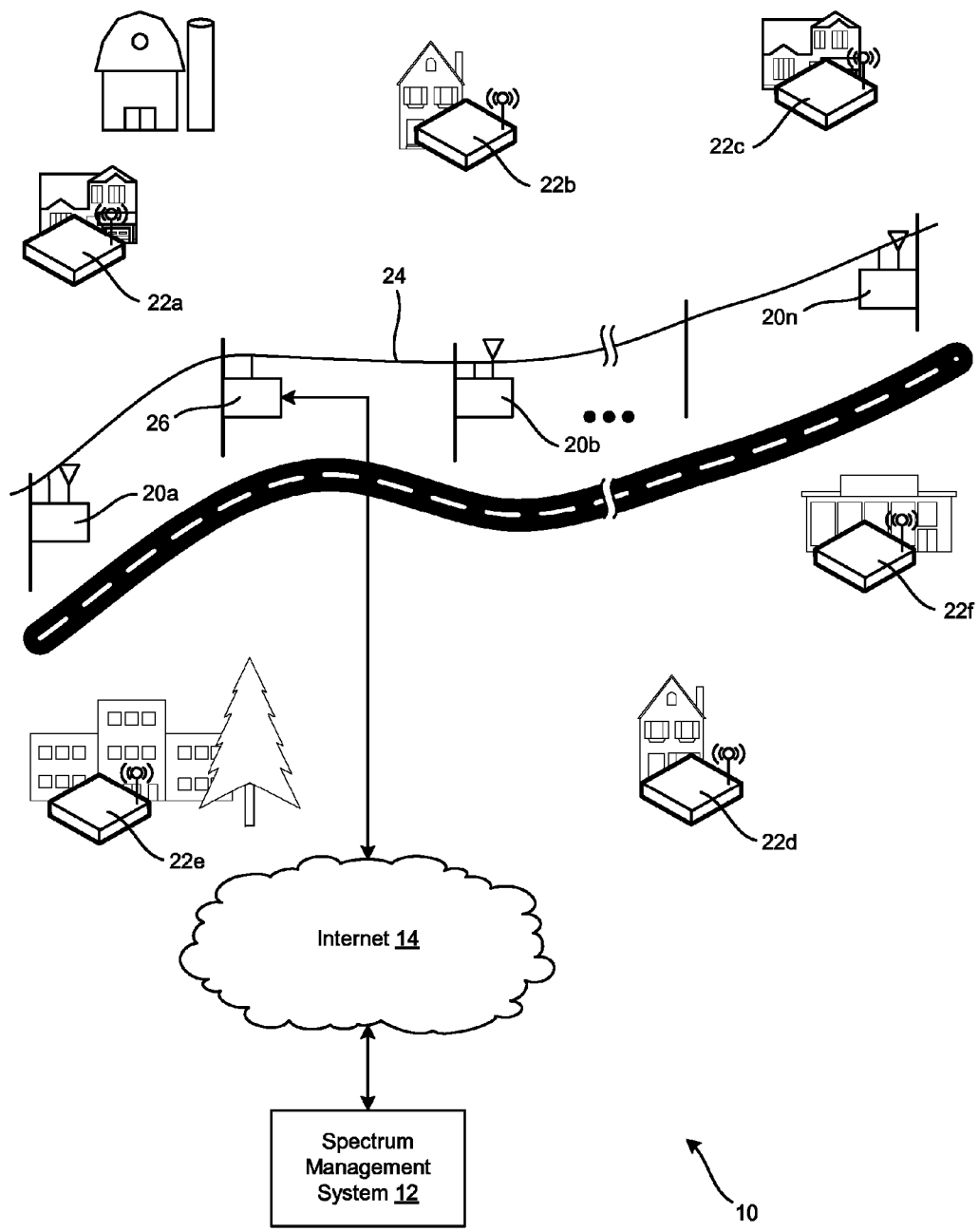
FIG. 1 is a schematic view of an exemplary communication system.

Embodiments will now be described with reference to the drawings, wherein like reference numerals are used to refer to like elements throughout. It will be understood that the figures are not necessarily to scale.

With initial reference to FIG. 1, an exemplary communication system 10 is illustrated. It will be understood that the illustrated and described communication system 10 is intended to include representative components that may take advantage of the techniques and devices that are described in greater detail below. Therefore, the topology of the depicted communication system 10 of FIG. 1 is for description purposes, and may vary from the topology that is shown.

The system 10 may include a spectrum management system 12 that communicates with deployed radio devices through a network. In the illustrated embodiment, the network is the Internet 14.

Figure 2:
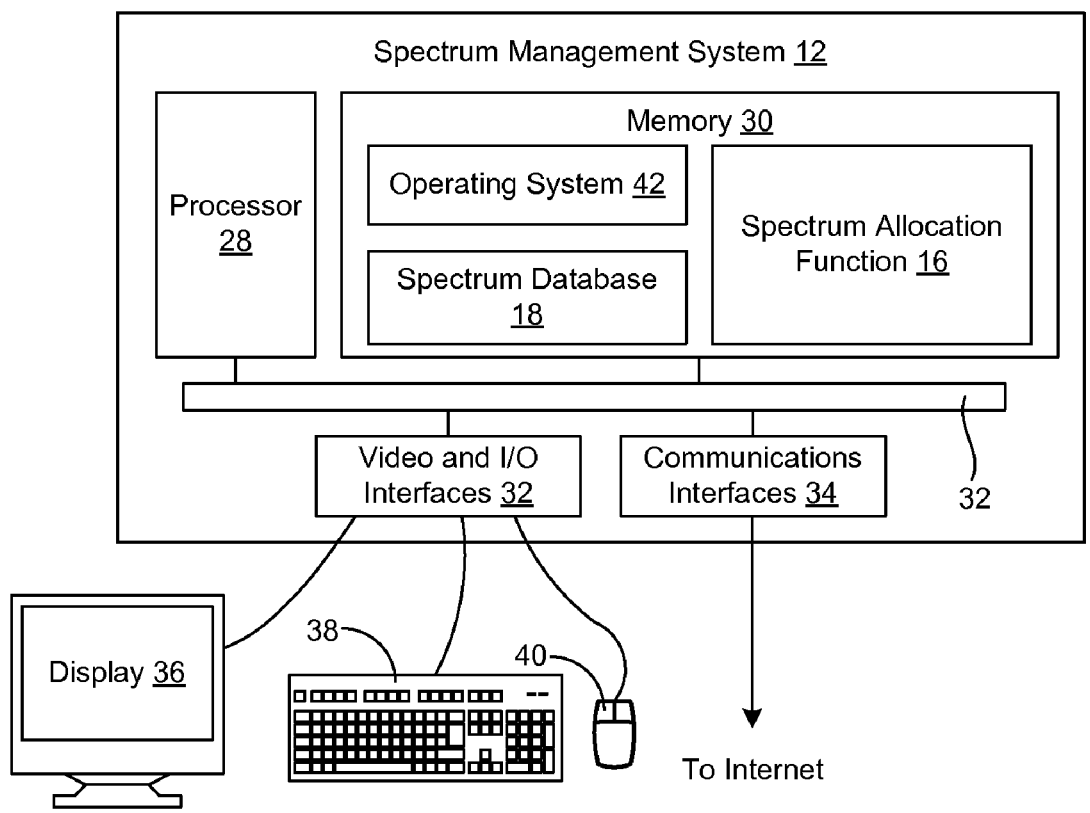
FIG. 2 is a schematic block diagram of an exemplary spectrum management system for overseeing spectrum use by radio devices in the exemplary communication system of FIG. 1.

With additional reference to FIG. 2, shown is a schematic block diagram of the spectrum management system 12. The spectrum management system 12 is a computer-based system that is capable of executing computer applications (e.g., software programs). The spectrum management system 12 may be configured to execute a spectrum allocation function 16, and to store a spectrum database 18 that contains data regarding spectrum availability that is used by the spectrum allocation function 16. In the illustrated embodiment, the spectrum allocation function 16 and the spectrum database 18 are commonly hosted in the spectrum management system 12. It will be appreciated that the spectrum allocation function 16 and/or the spectrum database 18 may be hosted in a more distributed manner.

The spectrum management system 12 is configured to make spectrum usage determinations and/or provide spectrum allocation to one or more radio devices that function as wireless access points 20. The wireless access points 20 are configured to provide Internet 14 access to radio devices 22 of end users. The radio devices 22 of the end users are compatible with and communicate with the wireless access points 20 using the spectrum that is allocated with the wireless access points 20 by the spectrum management system 12.

The radio devices 22, also known as wireless subscriber devices, may be part of or connected to other electronic devices to allow the electronic devices to communicate through the Internet with remote devices, such as servers and other end user devices. The electronic devices may include, for example, computers, televisions, voice over Internet protocol (VoIP) phones, and so forth. Typically, the radio devices 22 (and associated electronic devices) will be located inside buildings, but outdoor use is also contemplated. In the illustrated embodiment, radio devices 22a, 22b, 22c and 22d are associated with residences of the end users. Some radio devices 22 also may be associated with entities. For instance, in the illustrated example, radio device 22e is associated with a school and radio device 22f is associated with a business. Although the illustrated example shows one radio device 22 per building, there may be plural radio devices 22 in or associated with a building, or one radio device 22 may service more than one building.

The wireless access points 20, in the illustrated embodiment, are distributed along a linear terrestrial-based distribution medium 24. The distribution medium 24 of this embodiment may be considered "terrestrial" since the distribution medium 24 uses a cable backbone to carry signals between and/or among components that are operatively connected to the distribution medium 26. The components that are operatively connected to the distribution medium 24 include the wireless access points 20 and an Internet interface device 26, which are preferably connected to the distribution medium 24 by direct cable connections. The cable backbone of the distribution medium 24 may be implemented using, for example, coaxial cable or fiber optic cable. Converters, taps and interface devices for the components that connect to the distribution medium 24 may be present. As an alternative to a cable backbone, or for just some segments of the distribution medium 24, the distribution medium 24 may include point-to-point microwave links. In the illustrated example, the cables of the distribution medium 24 are suspended by poles (commonly referred to as "telephone poles" or "utility poles") and the wireless access points 20 and Internet interface device 26 are mounted to the poles. In other embodiments, a portion of or the entire distribution medium 24 may be buried, and/or some or all of the wireless access points 20 and/or the Internet interface device 26 may be located in or on other supporting structures (e.g., utility cabinets, buildings, etc.).

In the illustrated example, the distribution medium 26 follows alongside a road. It will be appreciated that some or all the distribution medium 26 may follow alongside other infrastructure (e.g., power lines, railroad tracks, an office complex, etc.) or natural geography (e.g., along a river, around a mountain, etc.), and/or the distribution medium 26 may be arranged independent of any other infrastructure.

The distribution medium 24 of the illustrated embodiment may be considered "linear" since the wireless access points 20 are positioned at predetermined points along the length of the distribution medium 24. The Internet interface device 26 may be located at any appropriate position along the distribution medium 24. Also, the Internet interface device 26 may service more than one distribution medium 24 and associated wireless access points 20. Further, plural distribution mediums and associated access points 20 may be logically and/or physically grouped together. In this case, the spectrum management system 12 may consider all wireless access points 20 in the group when allocating spectrum.

Connectivity of the wireless access points 20 to the distribution medium 24 may take any appropriate form. For instance, the wireless access points 20 may be daisy chained together using the distribution medium 24 or the wireless access points 20 may be tapped off of the distribution medium 24.

The wireless access points 20 may be spaced apart at appropriate intervals and the spacing between each pair of wireless access points 20 along the distribution medium 24 need not be the same. The spacing may be determined on a number of factors, such as transmit power employed by the wireless access points 20, the number of radio devices 22 serviced by the wireless access points 20, the terrain over which the communication system 10 is deployed, and so forth. In rural areas, where demand for wireless service may be relatively low, wireless access points 24 may be positioned to correspond to the location of building, recreation sites, or other places where radio devices 22 are likely to be present. In urban areas, where demand for wireless service may be relatively high, wireless access points 24 may be positioned on a more frequent basis and with regularity in the spacing between wireless access points 20. Therefore, spacing between wireless access points 20 could be on the order of tens of meters to tens of kilometers. To assist the spectrum management system 12 in allocating spectrum to the wireless access points 20, the geographic location of each wireless access point 20 may be known to the spectrum management system 12.

The Internet interface device 26 may have an appropriate connection to the distribution medium 24, such as a tap or network connection. The Internet interface device 26 may have a wireless connection or a terrestrial connection to establish communication with the infrastructure of the Internet 14, such as by fiber cable, coaxial or other wired connection.

The spectrum management system 12 may allocate spectrum to each wireless access point 20. The allocated spectrum is used by the wireless access point 20 to carry out wireless communications with the radio devices 22 and establish Internet access for the radio devices 22. The allocated spectrum for each individual wireless access point 20 may be in the form of one or more channels to which the wireless access point 20 may tune.

The spectrum allocated to the wireless access points 20 may be derived from one or more sources of available spectrum including, for example, licensed spectrum or unlicensed spectrum. In the case of licensed spectrum, the spectrum may be obtained by licensing the spectrum from an appropriate authority, such as the Federal Communications Commission (FCC) in the United States or the European Telecommunications Standards Institute (ETSI) in Europe. The spectrum may be licensed by an operator of the spectrum management system 12 and/or an operator of the wireless access points 20. Alternatively, the spectrum may be licensed by another party and made available to the communication system 10 through a secondary market license (sometimes referred to as sublicense) or a temporary transfer of use rights in the spectrum.

In the case of unlicensed spectrum, the spectrum may be from unlicensed spectrum bands. Unlicensed spectrum may be used without a license and by virtually any party, but regulations on the spectrum may be imposed. Exemplary unlicensed spectrum includes industrial, scientific and medical (ISM) bands and information infrastructure (UNII) bands. These bands are open to all users provided the users comply with certain regulations. In the U.S., these regulations are known as FCC Part 15. Traditionally, these bands have been used for microwave ovens, cordless phones, low powered wireless remote controls, and similar devices. Recently, with the advent of IEEE 802.11 (commonly known as WiFi), these bands have become very popular for computer communications and mobile data communications activities, as well as for point-to-point and point-to-multipoint applications.

Other unlicensed spectrum includes whitespace spectrum, which is available spectrum that is interleaved with other spectrum use. Exemplary whitespace space spectrum is known as television (TV) whitespace, which is made up of the guard bands and unused TV channels between TV channel 2 and TV channel 51 (corresponding to 54 MHz to 698 MHz). To avoid interference with digital TV broadcasts and other incumbent systems, such as wireless microphone systems, radios that use the TV whitespace (also knows as TV band devices or TVBDs) are required to register and receive a channel map of available channels that may be used for the communications activity of the radio system. Current regulations in the U.S. require these radio systems to register every twenty-four hours. Also, for mobile radios, if the radio moves into a new location, a new registration is required. Other regulations for TVBDs are present, such as transmitted power limits for different types of radios. Additional information regarding the regulation of TV whitespace may be found in FCC 08-260, Second Report and Order and Memorandum Opinion and Order, Adopted Nov. 4, 2008 and Released Nov. 14, 2008, the entirety of which is incorporated herein by reference. Similar proposals have been made in places other than the United States. For example, Ofcom in the United Kingdom has described access to certain spectrum by cognitive radios in "Digital Dividend: Cognitive-Access Consultation on License-Exempting Cognitive Devices Using Interleaved Spectrum," published Feb. 16, 2009.

Regardless of the class of spectrum in terms of whether the spectrum is licensed, unlicensed, or both, the spectrum may allocated to the wireless access points 20 to avoid interference in the operation of wireless access points 20 and avoid interference with other radio systems that are located in the vicinity of the wireless access points 20. For this purpose, the spectrum allocation function 16 may include an intelligent spectrum allocation engine that analyzes a number of factors and generates output decisions so that spectrum management system 12 may allocate spectrum to avoid interference. In general, the spectrum management system 12 undertakes responsibility to carry out managed spectrum access for the wireless access points 20. The factors that are considered as part of the managed spectrum access may include, but are not limited to, known locations of the wireless access points 20, distance between wireless access points 20, transmit power levels of the wireless access points 20 and wireless devices 22, terrain in the location of the wireless access points 20, spectrum use by other wireless systems, interference detections made by one or more of the wireless access points 20, an amount of data throughput needed to support a predetermined quality of service (QOS) for the radio devices 22, the number of wireless devices 22 being supported by each wireless access point 20, the amount of data routed through each wireless access point 20, bit rate of communications between the radio devices 22 and wireless access points 20, and so forth. More specific factors may include, but are not limited to, radio "ecosystem" knowledge in terms of known channel usage versus location, radio feedback metrics (e.g., packet completion, interference measurement, signal strength, etc.), and the availability of alternate types of spectrum (e.g., TVBD channels or licensed spectrum). In one embodiment, the wireless access points 20 and/or the radio devices 22 may communicate information to the spectrum management system 12 in order to assist the spectrum management system 12 make an appropriate spectrum allocation. Information that is communicated to or manually entered into the spectrum management system 12 about the wireless access points 20 and the radio devices 22 may be stored in the database 18.

The allocation of spectrum also may take into consideration the frequencies to which the radio devices 22 supported by each wireless access point 20 may tune, as well as the frequencies to which the wireless access points 20 may tune. In this manner, a "local view" may be taken of the communication capability of all devices in the communications system 10. These capabilities may be matched to the available spectrum at each wireless access point 20, and an appropriate channel allocation may be established for each wireless access point 20. In one embodiment, the database 18 may store information regarding the communication capabilities of each wireless device. This local view of available spectrum versus communications capabilities may allow for the "creation" of an appropriate channel assignment for each wireless access point. For instance, each channel (as defined by a set of frequency and radio communication parameters) that is allocated to the wireless access points 20 may be established by dividing the available spectrum into the respective channels.

Spectrum need not be allocated equally to each wireless access points 20. For instance, if one of the wireless access points 20 has a higher service load (e.g., in terms of servicing more radio devices 22, handling more data traffic, and/or supporting a higher QOS) than another one of the wireless access points 20, then the wireless access point 20 with the higher service load may be allocated more bandwidth than the wireless access point 20 with the lower service load. The allocation of varying amounts of spectrum may be balanced against spectrum availability and interference levels to determine if one or more wireless access points 20 may be allocated more spectrum than other wireless access points 20.

The spectrum allocated to each wireless access point 20 may change over time to account for changes in spectrum availability, spectrum use by other radio systems, deployment of new wireless access points 20, changes in radio device 22 tuning capability, changes in spectrum use and spectrum demand by the radio devices 22, and any other relevant consideration. In addition to or instead or making changes to spectrum allocation on an as needed basis, forced changes and/or renewals of spectrum allocation may be made. For instance, the spectrum allocations may be changed or renewed on a periodic basis (e.g., every twenty-four hours). In another approach, the spectrum allocation for each wireless access point 20 may have an expiration. Near or at the expiration time, the wireless access points may request a new allocation from the spectrum management system 12.

Also, available spectrum may be "reused" as much as possible by allocating overlapping spectrum (e.g., the same channel or part of a channel) to more than one wireless access point 20 provided that unacceptable levels of interference do not arise. The wireless access points 20 that are allocated the overlapping spectrum may be separated by one more other wireless access points 20 that are allocated different spectrum and/or by a predetermined minimum distance.

Alternatively, the spectrum allocation may be relatively simple, such as by using a repeating pattern down the length of the distribution medium 24. For instance, if three channels, A, B and C, are available, the channels may be allocated in a predetermined order, such as channel A, then channel B, and then channel C, and then repeating the allocation.

The spectrum allocation may allocate spectrum from a pool of available spectrum. Within the pool of available spectrum, also referred to as a channel pool or spectrum pool, it is contemplated that there will be at least one available operating channel in the location of each wireless access point 20. Preferably, more than one operating channel may be available for allocation to each wireless access point 20. The available operating channels for the various wireless access points 20 may change with changes in location. For example, the operating channels that are available to a first one of the wireless access points 20a on one end of the distribution medium 24 may not be the same as the operating channels that are available to an adjacent wireless access point 20b and/or a last wireless access point 20n at the other end of the distribution medium 24, or other intervening wireless access points 20. Therefore, each wireless access point 20 may be associated with its own channel pool.

In the case of licensed spectrum, the licensed spectrum may be logically separated into multiple channels to form the operating channels in the channel pool. For instance, if the available licensed spectrum has a bandwidth of about 20 MHz, the licensed spectrum may be separated into four 5 MHz wide channels that constitute the operating channels that may be allocated to the wireless access points 20. It will be appreciated that the operating channels may have bandwidths that are smaller or larger than 5 MHz. Also, the operating channels need not have the same bandwidth. The operating channels need not be from the same source (e.g., the operating channels may be derived from different licenses or sublicenses). The operating channels need not be contiguous in frequency from one operating channel to the next.

In the case of unlicensed spectrum, one potential source of spectrum is whitespace spectrum, such as TV whitespaces. Typically, radio systems that operate using TV whitespaces will register with a whitespace spectrum manager (WSSM) (also referred to as a whitespace service provider or WSSP) to receive a channel map of available whitespace channels and then select one of the available channels for wireless operations.

In one embodiment, this process may be altered for the communication system 10. For example, the spectrum management system 12 may function as the WSSM for the wireless access points 20 (and possibly other TVBDs that fall outside the communication system 10) or the spectrum management system 12 may register with a third party WSSM on behalf of the wireless access points 20. From the available whitespaces, the spectrum management system 12 may assign a whitespace channel to each wireless access point 20 to coordinate whitespace usage and minimize interference.

In another approach, the spectrum management system 12 may provide a channel map to each wireless access point 20 and the wireless access points 20 may select an operating channel, but the channel map contains guidance as to a preferred channel for the wireless access point 20. The guidance may be in the form of a channel suggestion or information concerning channel selections made by other wireless access points 20 and TVBDs that are near the wireless access point 20.

In another approach, the communication system 10 may, in effect, reserve whitespace spectrum by licensing the spectrum as low power television stations (LPTV), which establishes use rights in the corresponding channels. The channels associated with the LPTVs may be assigned to the wireless access points 20.

As indicated, the spectrum management system 12 may be implemented with computer technology. In one embodiment, the spectrum allocation function 16 is embodied as one or more computer programs (e.g., one or more software applications including compilations of executable code). The computer program(s) and/or database 18 may be stored on a computer readable medium, such as a memory in the form of a magnetic, optical or electronic storage device (e.g., hard disk, optical disk, flash memory, etc.).

To execute the function 16, the system 12 may include one or more processors 28 used to execute instructions that carry out a specified logic routine(s). In addition, the system 12 may have a memory 30 for storing data, logic routine instructions, computer programs, files, operating system instructions, and the like. As illustrated, the function 16 and the database 18 may be stored by the memory 30. The memory 30 may comprise several devices, including volatile and non-volatile memory components. Accordingly, the memory 30 may include, for example, random access memory (RAM) for acting as system memory, read-only memory (ROM), hard disks, optical disks (e.g., CDs and DVDs), tapes, flash devices and/or other memory components, plus associated drives, players and/or readers for the memory devices. The processor 28 and the components of the memory 30 may be coupled using a local interface 32. The local interface 32 may be, for example, a data bus with accompanying control bus, a network, or other subsystem.

The system 12 may have various video and input/output (I/O) interfaces 32 as well as one or more communications interfaces 34. The interfaces 32 may be used to operatively couple the system 12 to various peripherals, such as a display 36, a keyboard 38, a mouse 40, and other input and/or output devices. The communications interface 34 may include for example, a modem and/or a network interface card. The communications interface 34 may enable the system 12 to send and receive data signals, voice signals, video signals, and the like to and from other devices, including the wireless access points 20, via the Internet 14.

The memory 30 may store an operating system 42 that is executed by the processor 28 to control the allocation and usage of resources in the system 12, as well as provide basic user interface features. Specifically, the operating system 42 controls the allocation and usage of the memory 30, the processing time of the processor 28 dedicated to various applications being executed by the processor 28, and the peripheral devices, as well as performing other functionality. In this manner, the operating system 42 serves as the foundation on which applications, such as the function 16, depend as is generally known by those with ordinary skill in the art. The operating system 42 also may control much of the user interface environment presented to a user, such as features of the overall graphical user interface (GUI) for the system 12.

In one embodiment, the system 12 may be configured as a server that executes the function 16 to host the spectrum management functions of the spectrum management system 12. In the embodiment where the spectrum that is allocated by the spectrum management system 12 includes whitespaces, the spectrum database 18 may be implemented using a whitespaces database and the system 12 may serve as a registration system that is constructed in accordance with the above-mentioned FCC Report and Order or any other regulations concerning the management of whitespaces. The information included in this database may describe the location, contour, access or use rules (e.g., transmit power limits), and any other pertinent data related to the unlicensed spectrum.

Although certain embodiments have been shown and described, it is understood that equivalents and modifications falling within the scope of the appended claims will occur to others who are skilled in the art upon the reading and understanding of this specification.

What is claimed is:

1. A distributed wireless network for delivering Internet connectivity to geographically diverse wireless subscriber devices, comprising:

a plurality of wireless access points that operatively connect to the Internet through a terrestrial distribution medium, each wireless access point configured to establish a wireless interface with at least one of the wireless subscriber devices for providing Internet connectivity to the wireless subscriber device, and a channel allocation engine that controls each wireless access point to operate on a channel selected by the channel allocation engine from an available channel pool associated with the wireless access point using channel selection parameters to minimize interference between the wireless access points and between remote wireless subscriber devices having Internet connectivity through different wireless access points, wherein the channel allocation engine is a centralized spectrum management system that respectively allocates the selected channels to the wireless access points; and wherein each wireless access point receives a channel allocation from the channel allocation engine via the Internet and the terrestrial distribution medium.

2. The distributed wireless network of claim 1, wherein at least one wireless access point is allocated a channel that has a larger bandwidth than other wireless access points.

3. The distributed wireless network of claim 2, wherein a bandwidth of each allocated channel is determined by the channel allocation engine based on service load of the corresponding wireless access point.

4. The distributed wireless network of claim 1, wherein the allocated channel for each wireless access point is changed or renewed over time.

5. The distributed wireless network of claim 1, wherein the channels of the available channel pools are each a whitespace.

6. The distributed wireless network of claim 5, wherein the whitespaces are TV whitespaces.

7. The distributed wireless network of claim 1, wherein the channels of the available channel pools are derived from licensed spectrum.

8. The distributed wireless network of claim 1, wherein the channel allocation for each wireless access point takes into account communication capabilities of the wireless subscriber device serviced by the wireless access point.

9. The distributed wireless network of claim 1, wherein the distribution medium includes a coaxial cable backbone or fiber optic cable backbone.

10. The distributed wireless network of claim 1, wherein overlapping spectrum is allocated to at least two of the wireless access points.

11. A spectrum management system for a distributed wireless network that delivers Internet connectivity to geographically diverse wireless subscriber devices and that includes a plurality of wireless access points that operatively connect to the Internet through a terrestrial distribution medium, comprising a channel allocation engine configured to allocate operating channels to each of the wireless access points, the allocation including selecting each respective operating channel from an available channel pool associated with the wireless access point using channel selection parameters to minimize interference between the wireless access points and between wireless subscriber devices having Internet connectivity through different wireless access points, wherein the channel allocation engine is a centralized spectrum management system that respectively allocates the selected channels to the wireless access points to control channel use of the wireless access points; and a channel allocation for each wireless access point is delivered from the channel allocation engine via the Internet and the terrestrial distribution medium.

12. The spectrum management system of claim 11, wherein at least one wireless access point is allocated a channel that has a larger bandwidth than other wireless access points.

13. The spectrum management system of claim 12, wherein a bandwidth of each allocated channel is determined by the channel allocation engine based on service load of the corresponding wireless access point.

14. The spectrum management system of claim 11, wherein the allocated channel for each wireless access point is changed or renewed over time.

15. The spectrum management system of claim 11, wherein the channels of the available channel pools are each a whitespace.

16. The spectrum management system of claim 15, wherein the whitespaces are TV whitespaces.

17. The spectrum management system of claim 11, wherein the channels of the available channel pools are derived from licensed spectrum.

18. The spectrum management system of claim 11, wherein the channel allocation for each wireless access point takes into account communication capabilities of the wireless subscriber device serviced by the wireless access point.

19. The spectrum management system of claim 11, wherein the distribution medium includes a coaxial cable backbone or fiber optic cable backbone.

20. The spectrum management system of claim 11, wherein overlapping spectrum is allocated to at least two of the wireless access points.

* * * * *